United States Patent [19]

Schmidt

[11] 4,401,343

[45] Aug. 30, 1983

[54] UPHOLSTERED SEAT FOR MOTOR VEHICLE

[75] Inventor: Hans T. Schmidt, Bad Friedrichshall, Fed. Rep. of Germany

[73] Assignee: Audi NSU Auto Union Aktiengesellschaft, Fed. Rep. of Germany

[21] Appl. No.: 235,686

[22] Filed: Feb. 18, 1981

[30] Foreign Application Priority Data

Mar. 4, 1980 [DE] Fed. Rep. of Germany ....... 3008179

[51] Int. Cl.³ .............................................. A47C 3/00
[52] U.S. Cl. .................................. 297/284; 297/353; 297/337; 297/452
[58] Field of Search ............... 297/284, 311, 353, 312, 297/452, 458, 337

[56] References Cited

U.S. PATENT DOCUMENTS

| 423,698 | 3/1890 | Plimsoll | 297/284 |
| 1,205,802 | 11/1916 | Silbert | 297/284 |
| 2,239,732 | 4/1941 | Newhardt | 297/353 |
| 2,509,102 | 5/1950 | Kuebler | 297/353 |
| 3,550,953 | 12/1970 | Neale | 297/284 |
| 4,032,190 | 6/1977 | Muller-Oeisig | 297/353 |
| 4,334,709 | 6/1982 | Akiyama et al. | 297/284 |

FOREIGN PATENT DOCUMENTS 1396937 3/1965 France ............................... 297/284

Primary Examiner—Francis K. Zugel
Attorney, Agent, or Firm—Kane, Dalsimer, Kane, Sullivan and Kurucz

[57] ABSTRACT

An upholstered seat for a motor vehicle having a seat member and a backrest, one or both of which includes a central part and a U-shaped edge part, at least partly surrounding the central part, and formed with a peripheral support element, said U-shaped edge part being adjustable in a lengthwise direction in relation to the respective central part to change the size of the support area.

3 Claims, 4 Drawing Figures

U.S. Patent   Aug. 30, 1983   4,401,343
Fig. 1
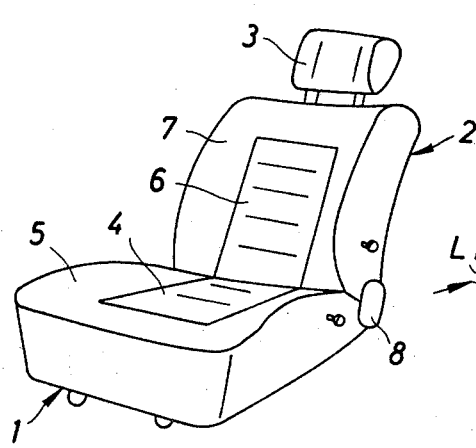
Fig. 2
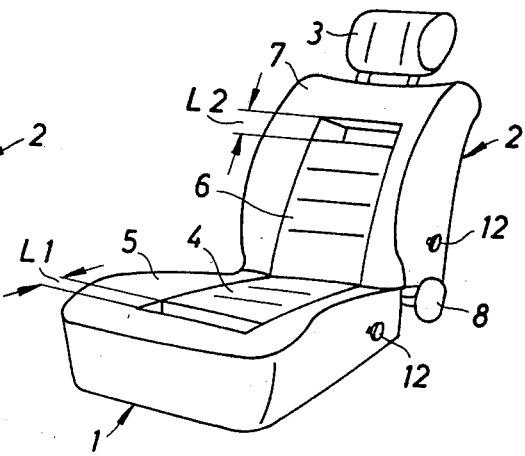
Fig. 4
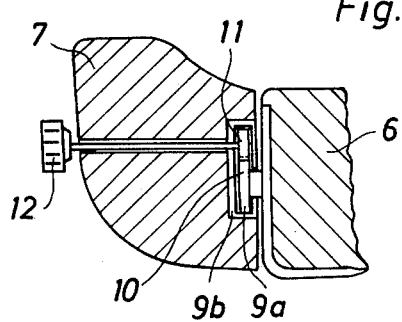
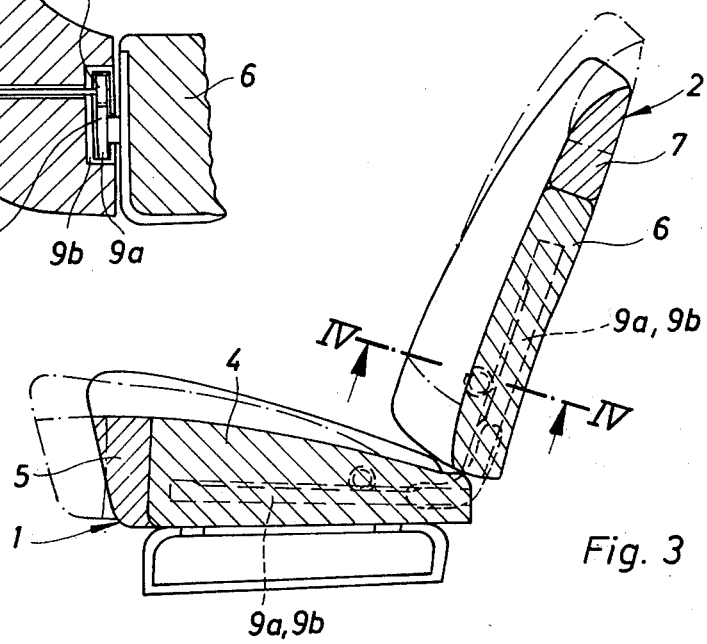
Fig. 3

UPHOLSTERED SEAT FOR MOTOR VEHICLE

This invention relates to an upholstered seat for a motor vehicle, including a main seat member and a backrest.

It has been proposed to alter the depth from front to rear of an upholstered seat by swinging up an adjustable extension at the forward end of the seat. This adjustable front seat extension will provide a support position for the legs of a taller person, but does not provide continuously variable stepless adjustment of seat depth for persons of differing body sizes. It is also desirable that when a vehicle seat is adjusted for use by taller persons, any lateral guides on the seat member and the backrest should provide proper lateral support and location for the body.

It is an object of the present invention to provide an adjustable upholstered seat for a motor vehicle, which will allow proper support for all body sizes.

The invention consists broadly in an upholstered seat for a motor vehicle, comprising a seat member and a backrest, one or both of which includes a central part and a U-shaped edge part, at least partly surrounding the central part, and formed with a peripheral support element, and adjustable in a lengthwise direction in relation to the respective central part.

As a result of this design of the upholstered seat, in which at least one section of the seat includes a central part and an adjustable edge part, smooth continuous infinitely variable adjustment can be effected, giving the user, irrespective of his body size, both lateral support and guide, and also comfortable thigh support at the front and thus a safe and comfortable sitting position. In this construction the central part acts primarily as a central support, while the edge part slides lengthwise (i.e. front-to-rear) and can be individually adjusted to suit the length of the user's upper body and thighs.

For ease of adjustment the U-shaped edge part is preferably guided relative to the central part on rails and is adjustable by means of an adjusting mechanism.

The adjusting mechanism is conveniently in the form of a rack and a pinion, actuated by a handwheel.

The invention may be performed in various ways and an example of one design according to the invention will now be described in detail with reference to the accompanying drawings, in which:

FIG. 1 is a perspective view of an upholstered seat for a motor vehicle in one position, FIG. 2 is a similar view showing the upholstered seat of FIG. 1 in an adjusted position, FIG. 3 is a vertical section through an upholstered seat in accordance with the invention, and FIG. 4 is a section through a portion of the upholstered seat on the line IV—IV in FIG. 3.

The upholstered seat for a motor vehicle illustrated in FIG. 1 consists essentially of a seat member 1 and a backrest 2 with a headrest 3. The seat member 1 comprises a central part 4 and a U-shaped edge part 5. The edge part 5 encloses the central part 4 around the front and sides, and incorporates in the conventional manner a peripheral element forming a lateral guide for the user's thighs. The backrest 2 likewise comprises a central part 6 and a U-shaped edge part 7 enclosing the central section 6 around the top and sides. The edge part 7 also incorporates a peripheral element formed on it, which acts as a lateral guide for the upper part of the user's body. The upholstered seat is thus divided into central and edge parts such that the body of the user rests mainly on the central parts 4 and 6, while the edge parts (5 and 7) act as supports and lateral guides. The central parts 4 and 6 are hinged together by means of a hinge fitting 8 in the conventional manner.

In FIG. 2 the U-shaped edge parts 5 and 7 of the upholstered seat in FIG. 1 have been shifted in relation to the respective central parts 4 and 6, thus also allowing a tall person to assume a comfortable and safe sitting position. It will be seen that the U-shape of the edge parts 5 and 7 extends the depth of the seat part 1 by a length L1 and thus the support for the user's thighs on the adjustable edge part 5, the lateral guide for the thighs formed by the peripheral element being simultaneously shifted forward. The backrest 2 is likewise extended by a length L2 by sliding the U-shaped edge part 7, the lateral guide for the upper part of the body being likewise shifted upwards. The position of the headrest 3 secured to the edge part 7 alters with that of the latter, so that the headrest is also moved into the correct position for a tall person.

FIG. 3 shows the upholstered seat in section in its normal position. To shift the edge parts 5 and 7 guide rails 9a and 9b are provided between the central parts 4 and 6 and the edge parts 5 and 7. An adjusting mechanism is also provided, allowing continuously variable stepless adjustment of the edge parts 5 and 7, which can be matched independently of each other to the length of the upper part of the body and of the thighs of the user. The positions into which the seat member 1 and the backrest 2 can be extended by shifting the edge parts 5 and 7 are shown in dotted lines.

As can be seen from FIG. 4, the adjusting mechanism typically comprises a first guide rail 9a secured to the central part 6 or 4, and a second guide rail 9b secured to the edge part 7 or 5 and fitting the first guide rail 9a. A rack 10 is mounted on the first guide rail 9a, and a pinion 11 engages with it, located in bearings in the edge part 7 or 5, and actuated by a handwheel 12 on the outside of the edge part 7 or 5 near the hinge fitting 8.

I claim:

1. An upholstered seat for a motor vehicle, comprising a seat member and a backrest, at least one of which includes a support area with a central part, a U-shaped edge part at least partly surrounding said center part and adapted to provide lateral support, and means for adjusting said edge part in a lengthwise direction in relation to the respective central part to change the size of said support area.

2. An upholstered seat according to claim 1, in which said U-shaped edge part is guided relative to said central part on rails, and said adjusting means includes an adjusting gear mechanism.

3. An upholstered seat according to claim 2, in which said adjusting mechanism comprises a rack and a pinion, actuated by a handwheel.

* * * * *